United States Patent [19]

Marco

[11] Patent Number: 5,176,070
[45] Date of Patent: Jan. 5, 1993

[54] MACHINE FOR STUFFING STONED OLIVES AUTOMATICALLY WITH MEAT PASTE

[76] Inventor: Pennesi Marco, Via San Paterniano, 16 Grottammare, Italy

[21] Appl. No.: 806,604

[22] Filed: Dec. 12, 1991

[30] Foreign Application Priority Data

Dec. 12, 1990 [IT] Italy .................. N 3772 A/90

[51] Int. Cl.⁵ .................................................. A23N 4/08
[52] U.S. Cl. ...................................... 99/494; 99/548; 99/561; 99/565
[58] Field of Search .......... 99/494, 541, 542, 546–548, 99/552, 554, 555, 559–561, 564, 565; 426/282, 484, 485

[56] References Cited

U.S. PATENT DOCUMENTS

| | | |
|---|---|---|
| 2,351,788 | 6/1944 | Smith . |
| 2,858,862 | 11/1958 | Francisco . |
| 4,096,794 | 6/1978 | Gonzalez .................. 99/494 |
| 4,096,795 | 6/1978 | Gonzalez .................. 99/561 |
| 4,182,233 | 1/1980 | Gonzalez .................. 99/561 |
| 4,220,080 | 9/1980 | Margaroli et al. .......... 99/565 |
| 4,265,169 | 5/1981 | Silvestrini ................ 99/549 |
| 4,290,350 | 9/1981 | Gonzalez .................. 99/494 |
| 4,644,859 | 2/1987 | Rubio et al. ............... 99/548 |
| 4,727,802 | 3/1988 | Gonzalez .................. 99/561 |
| 4,905,584 | 3/1990 | Rubio ..................... 99/548 |
| 4,913,044 | 4/1990 | Heath ..................... 99/565 |
| 4,925,691 | 5/1990 | Cimperman ................ 426/485 |

Primary Examiner—Timothy F. Simone
Attorney, Agent, or Firm—Dvorak and Traub

[57] ABSTRACT

In a machine for stuffing olives automatically with meat paste, olives are transferred from a serial infeed station to a runout station, at which the stuffed end product emerges, by way of a transfer station that comprises an indexing conveyor with peripheral contoured pockets interconnected by a profiled channel; the channel freely accommodates a fixed knife by which the top part of each olive is cut at a station between the infeed and runout stations, and a divaricator serving to spread the sides of the cut olive and thus create an opening into which the meat paste can be forced by an injector supplied from a relative feeder station. Advantageously, the infeed and runout stations, the conveyor and the feeder station are mechanically interconnected and driven synchronously by a single power transmission system.

18 Claims, 4 Drawing Sheets

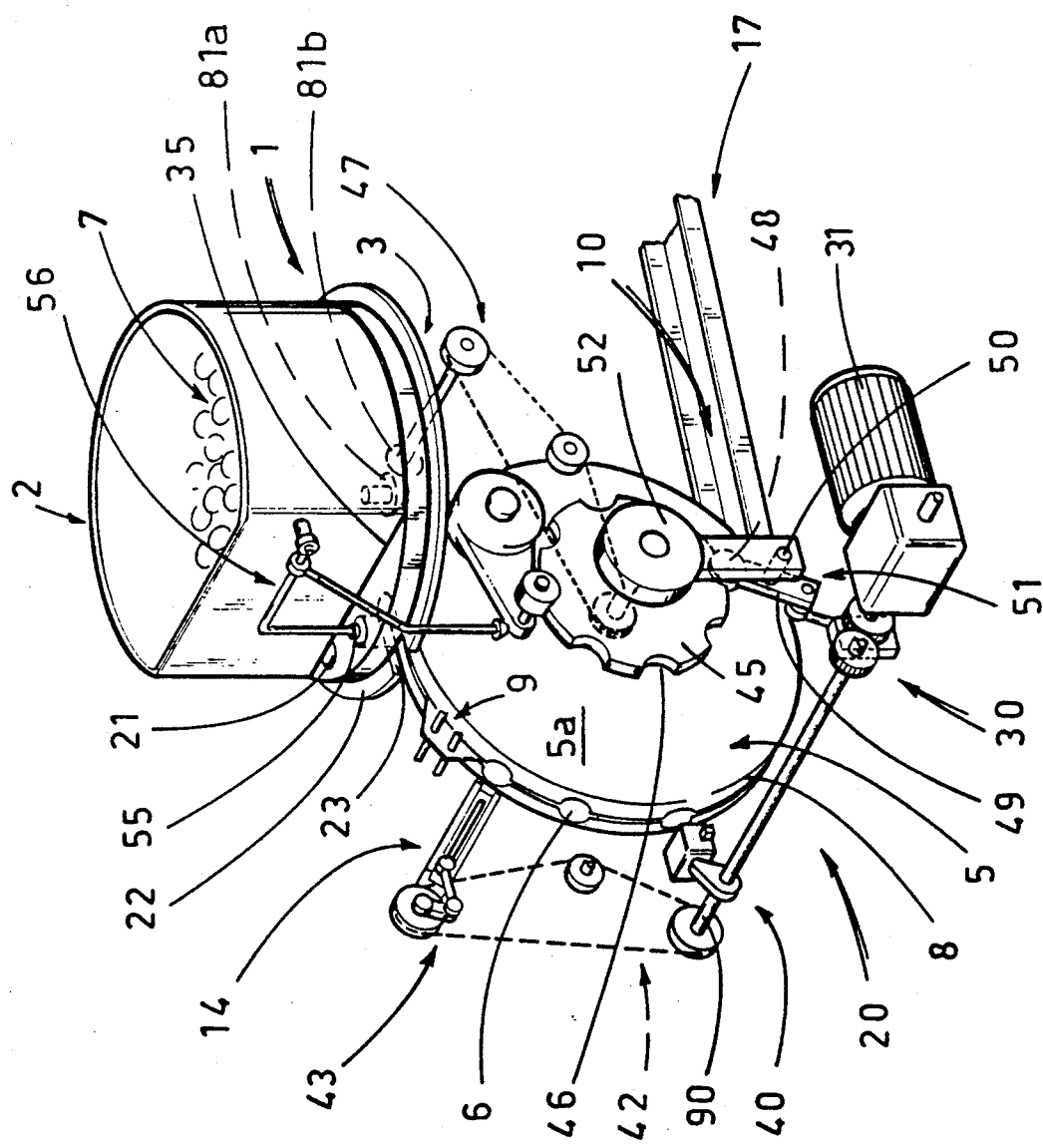

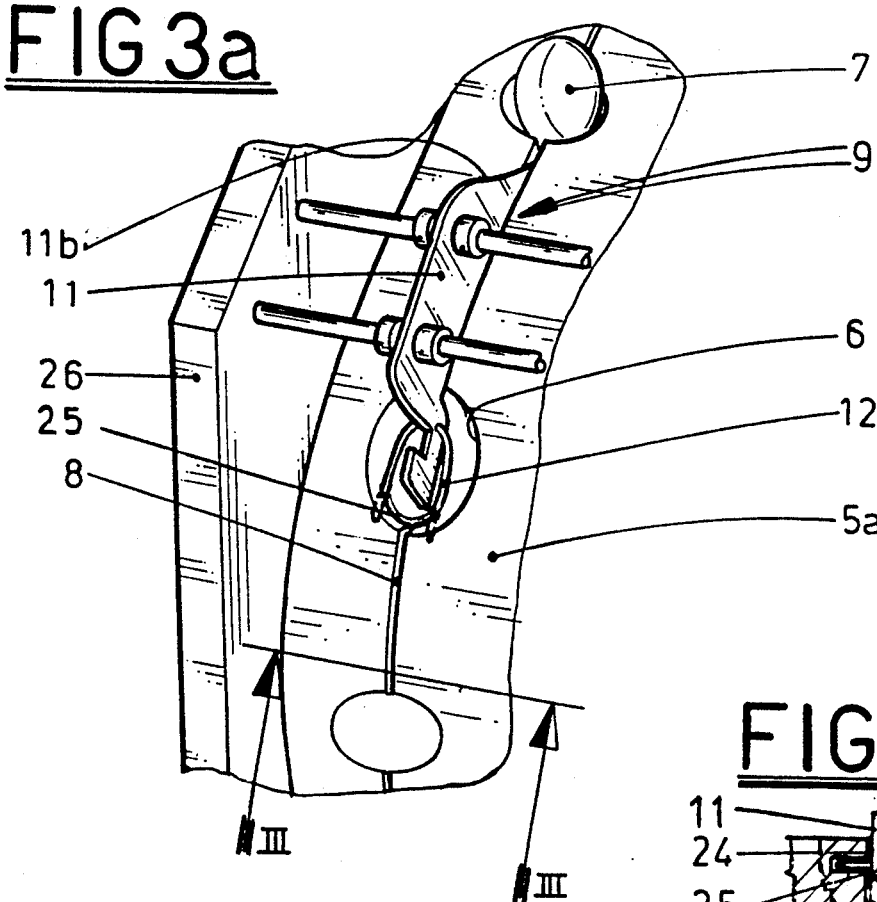
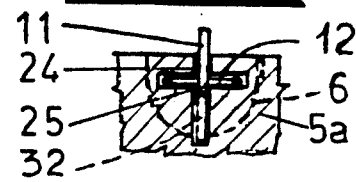
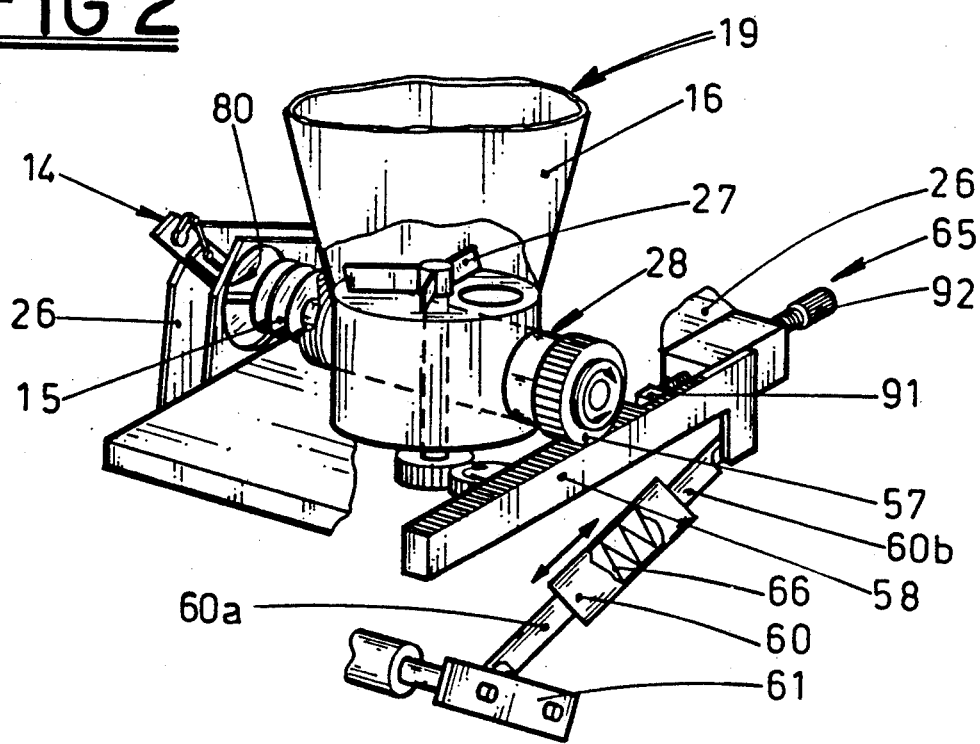

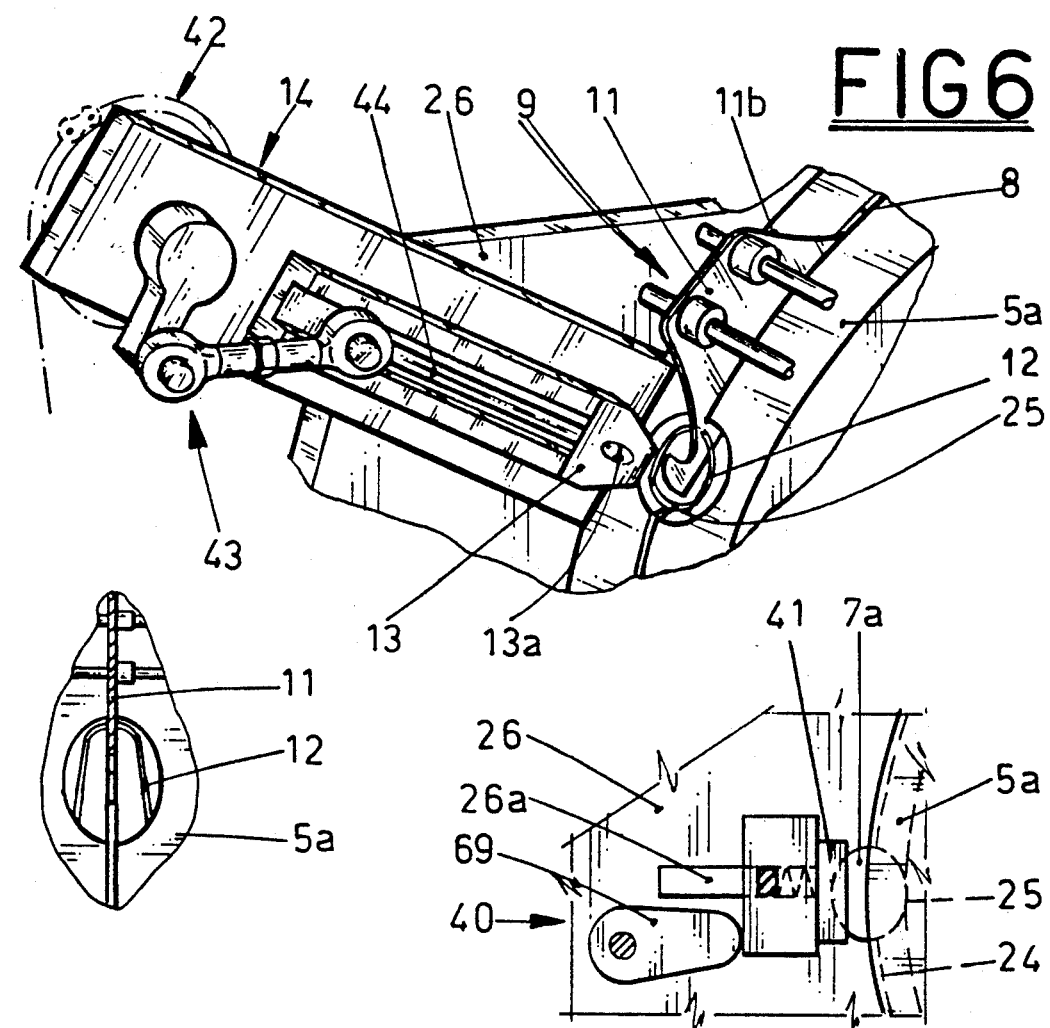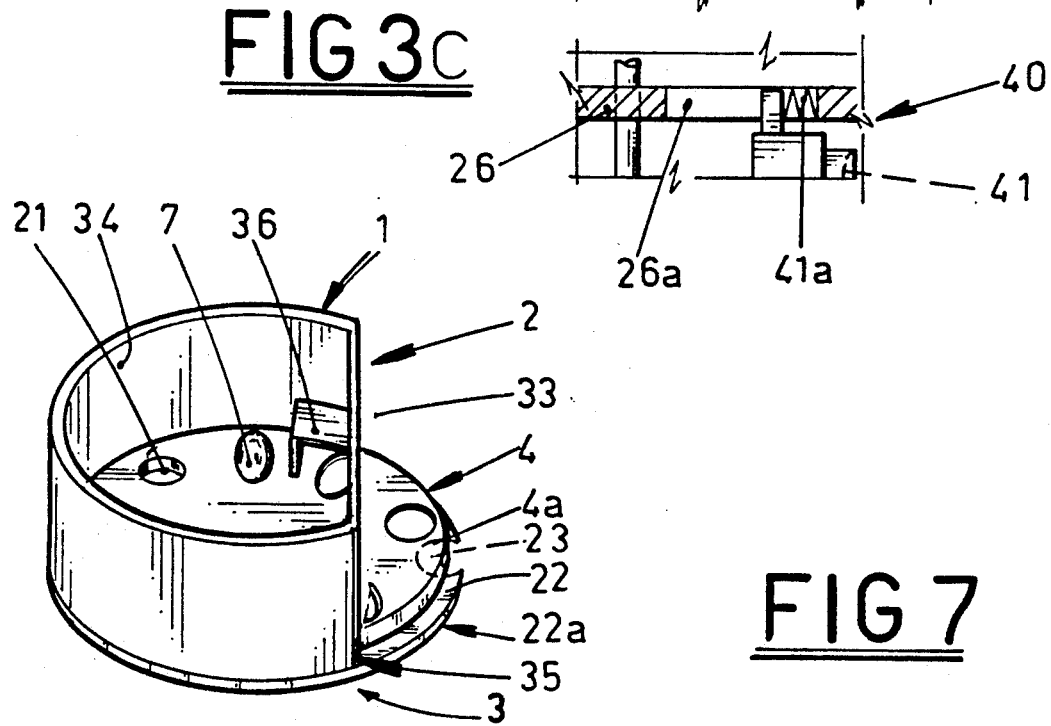

MACHINE FOR STUFFING STONED OLIVES AUTOMATICALLY WITH MEAT PASTE

BACKGROUND OF THE INVENTION

The present invention relates to a machine by means of which stoned olives are stuffed automatically with a meat paste.

The operation of stuffing olives with meat paste is accomplished currently utilizing automatic machines equipped with mechanical type manipulators piloted by electronic control circuits.

Conventional automatic olive-stuffing machines are all typified by a notably complicated construction, resulting disadvantageously in high capital outlay and running costs. Moreover, given the complexity of the mechanical section and the problems posed by its interface with the electronic section, which is no less complex, the dependability of the machine when in operation tends to be low, as also does the quality of the end product.

The object of the present invention is to overcome the difficulties encountered in stuffing stoned olives automatically with meat paste, by providing a machine totally dissimilar from the conventional pattern mentioned above, which is able to produce an end product of quality comparable to that of the equivalent handmade article.

SUMMARY of the INVENTION

The stated object is fully realized in a machine according to the invention, which features a set of mechanically synchronized work stations including a serial infeed station, a runout station at which the end product emerges, and a station through which stoned olives are transferred singly from the infeed station to the runout station by means of an indexing conveyor affording mutually aligned and equispaced pockets in which the olives dispensed from the serial infeed station are taken up during the pauses between indexed steps, and a continuous profiled channel passing through the pockets.

The machine also comprises a cutting station, lying between the infeed and the runout station, equipped with a fixed knife that is elevated in relation to the lower half of the olives carried in the single pockets of the conveyor in such a way as to cut longitudinally through the top part of the olive only, and a divaricator occupying a fixed position in the channel immediately beyond the knife, which serves to spread apart the sides of each previously cut olive and thus open up the internal cavity in readiness for stuffing by an injector device, which is supplied with the meat paste from an associated feeder station.

As disclosed in the following specification, the entire assemblage of stations and devices briefly summarized above can be set in motion and timed in operation by a single transmission system utilizing conventional linkages and driven by a single motor. The fundamental advantage of the invention is that it teaches reduced complexity in construction of the machine, thus bringing clear economic benefits as well as greater reliability in operation.

BRIEF DESCRIPTION of the DRAWINGS

The invention will now be described in detail, by way of example, with the aid of the accompanying drawings, in which:

FIG. 1 shows the invention from the front and in perspective, with parts omitted better to reveal certain of the characterizing features;

FIG. 2 shows the parts of the invention omitted from FIG. 1, likewise in perspective;

FIGS. 3a, 3b and 3c are enlarged details of the invention as illustrated in FIG. 1, with FIG. 3b showing the section through III—III in FIG. 3a;

FIGS. 5, 6 and 7 illustrate certain details of the invention, seen enlarged and in perspective.

DESCRIPTION of the PREFERRED EMBODIMENTS

Figure 4:
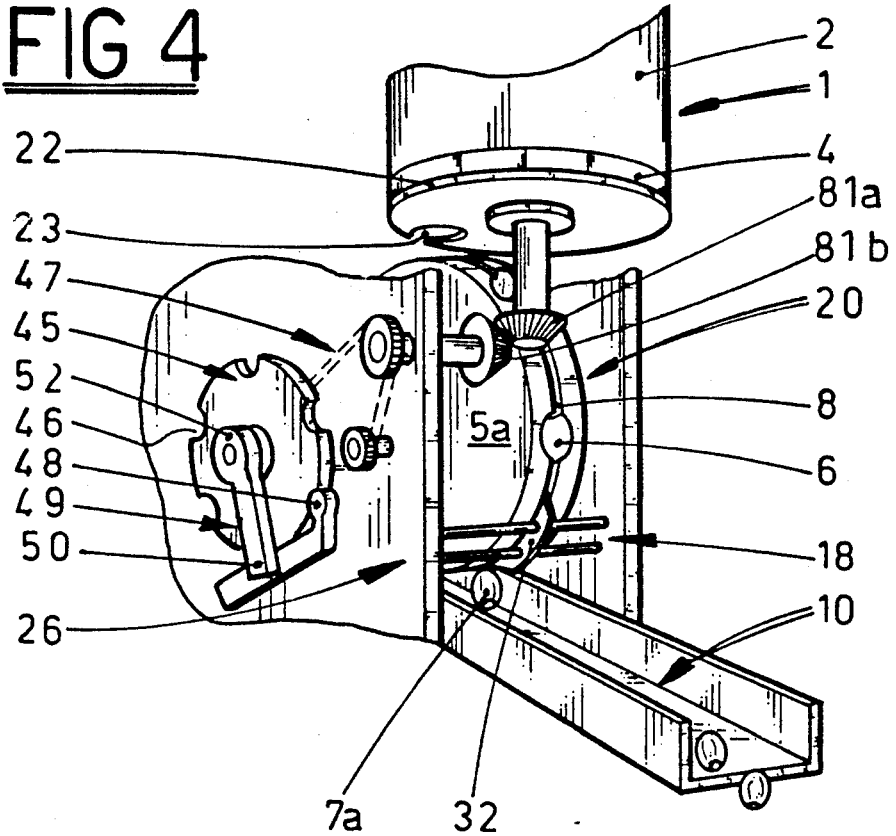
FIG. 4 shows the invention from the rear and in perspective.

Referring to the drawings, the invention consists essentially in machine 17 for stuffing meat paste automatically into the cavities of stoned olives 7; such a machine substantially comprises: a transfer station 20, through which the stoned olives 7 are taken singly and in succession from a serial infeed station 1 to a runout station 10, where the stuffed olives 7a emerge; an injector device 14 supplied with the paste from a relative feeder station 19; and actuator means 30 by which the serial infeed station 1, the transfer station 20, the meat paste feeder station 19 and the injector device 14 are operated synchronously one with another.

The transfer station 20 in its turn comprises a conveyor 5, embodied as an intermittently rotating wheel 5a of which the peripheral face is occupied by a plurality of pockets 6 disposed in alignment one with the next and spaced uniformly apart.

The geometry of the pockets 6 is matched to the shape of the olives 7, such that with each pause of the intermittently rotating conveyor 5, an olive dispensed from the serial infeed station 1 above is taken up in a corresponding pocket.

Figure 5:
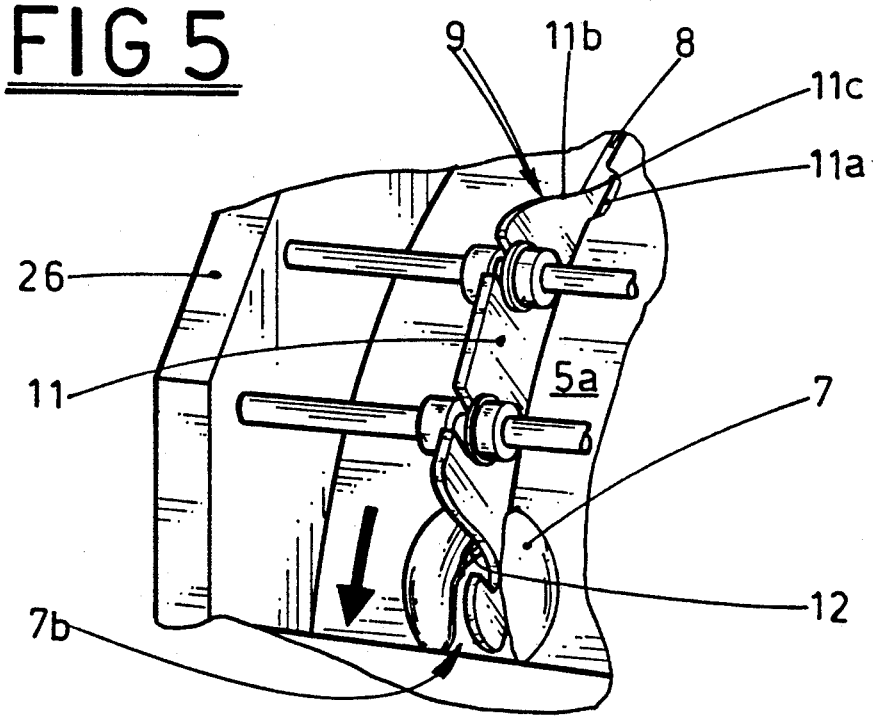

The transfer station 20 further affords a profiled longitudinal channel 8 extending continuously round the periphery of the conveyor 5 and passing through the pockets 6, and a cutting station denoted 9, which is located between the infeed station 1 and the runout station 10 and equipped with a knife 11 insertable in the channel 8; advantageously, the knife 11 is fixed and elevated in relation to the bottom side of the olives 7 occupying the pockets 6 of the conveyor, in order to cut longitudinally through the top side of each olive 7 only. Referring particularly to FIGS. 3a and 3b it will be seen that the profiled channel 8, viewed in section through a plane coinciding with the rotational axis of the wheel 5a, exhibits a substantially radial first gap 24 positioned outermost and merged on the inside with a second gap 25 of greater dimensions. The channel 8 also compasses a fixed divaricator 12 positioned immediately beyond the knife 11 in the direction of the runout station 10, of which the purpose is to spread apart the two cusps of each successive olive 7 engaged by the knife 11 (FIG. 5), thus creating a discernible void 7b matched to the outlet 13a of a nozzle 13 forming part of the meat paste injector device 14, which is supplied with the paste from the feeder station 19 and activated at each pause of the conveyor 5.

As discernible from FIG. 6, the knife 11 is anchored permanently to the frame 26 of the machine 17, and the divaricator 12 associated rigidly with the end of the knife 11 directed toward the runout station. In the example of the accompanying drawings, the knife 11 exhibits a substantially wedged profile, comprising a first edge 11a at bottom of which the contour is matched to the longitudinal profile of the channel 8, and a sharp, raking second edge 11b uppermost that is partly inserted in the channel 8 and meets the bottom edge 11a at an acute angle of which the vertex 11c is set against the direction of rotation of the conveyor 5.

As illustrated in FIGS. 1 and 7, the serial infeed station 1 from which the olives 7 are dispensed will be seen to comprise a container 2, of which the base 3 is positioned over a rotating disk 4 indexed synchronously with the conveyor 5.

The single olives 7 are accommodated in a plurality of corresponding holes 21 afforded by the disk 4, and supported thus by a fixed disk 22 positioned beneath and flush with the rotating disk 4. 23 denotes a slot afforded by the fixed disk 22, which, as the rotating disk 4 indexes synchronously with the conveyor 5 below, allows the single stoned olives 7 to drop freely and in succession from the holes 21 as each is brought into vertical alignment with the opening.

In a preferred embodiment (FIG. 7), the container 2 comprises a flat vertical side wall 33 positioned over the conveyor 5, of which the ends are joined with the ends of a curved second wall 34 appearing as part of a substantially cylindrical surface; the flat side wall 33 affords a passage 35 extending end to end and admitting the rotating and fixed disks 4 and 22, in such a manner that respective portions 4a and 22a of the disks remain exposed, permanently outside the container 2.

As illustrated in FIG. 1, the slot 23 of the fixed disk 22 occupies the relative exposed portion 22a, such that each olive 7 picked up by the indexing disk 4 internally of the container 2 is directed through the passage 35 and round to the slot 23, thereupon dropping vertically into the pocket 6 of the conveyor 5 beneath.

36 denotes a plate attached to the side walls 33 and 34 internally of the container 2, positioned parallel with and marginally above the rotating disk 4 at the end of the flat wall 33 from which the disk 4 rotates outward through the passage 35, and serving to prevent the olives 7 from jamming and crushing in the passage 35 as the disk 4 is indexed.

The meat paste feeder station 19, shown in FIG. 2, is positioned alongside the transfer station 20 and comprises a hopper 16 to hold the supply of paste, associated with a tubular feeder 28 at bottom which is connected to the injector device 14, hence to the nozzle 13, by way of an opening 80 provided in the frame 26 of the machine 17.

Internally of the tubular feeder 28, the meat paste is forced toward the injector device 14 by a power driven screw 15.

A further power driven rotary element 27, operating internally of the hopper 16, serves to direct the meat paste down into the screw feeder 28. A preferred embodiment of the machine 17 further comprises a device 18 located preceding the runout station 10 in the indexing direction, by which the olives 7a stuffed with the meat paste are ejected from the corresponding pockets 6 of the conveyor 5 and caused to drop into the runout station 10. Such a device 18 may become necessary in the event, following injection of the paste, that the stuffed olives 7a become lodged in the pockets 6.

The device 18 in question comprises a substantially wedge shaped element 32 insertable in the channel 8 of the conveyor 5, which is secured to the frame 26 of the machine 17 and disposed with the acute angle of the wedge profile directed against the rotation of the wheel 5a.

More exactly, the point of the wedge element 32 is insertable in the channel 8 of the conveyor 5 in such a manner as to ride all but in contact with the wheel 5a, the outermost edge emerging obliquely in such a way that the stuffed olives 7a rotating as one with the wheel 5a are intercepted gradually and ejected from the relative pockets 6 (see FIG. 3b). The machine 17 comprises a further device 40, also located preceding the runout station 10, by means of which to ensure a regular shape of the olives 7a once stuffed with the meat paste. Such a device 40 comprises a die 41 shaped to match the contour of the olive 7 and capable of reciprocating movement in relation to the frame 26, sliding in a relative guide 26a, which is produced by actuator means 30 and controlled by flexible reaction elements 41a. During each pause of the transfer station 20, the die 41 moves toward the stuffed olive 7a occupying the corresponding pocket 6 of the conveyor 5, in such a way that each successive olive is compacted between the die and the pocket and invested with a final shape of regular proportions prior to its ejection from the conveyor 5.

The actuator means 30 mentioned are mechanically interdependent and driven by a common motor 31 in such a way that all movements and operations of the machine 17 can be brought about simultaneously. Such means comprise a first chain drive 42 to which the rotation of the motor 31 is transmitted by way of an intermediate shaft 90.

The first chain drive 42 is connected mechanically to a first crank linkage 43 serving to reciprocate a rod 44, mounted slidably and guidedly within the injector device 14, between a retracted position in which the device 14 is charged with meat paste from the feeder station 19, and an extended position coinciding with the activation of the nozzle 13, assumed at each pause of the conveyor 5, in which paste is driven forward by the rod 44 and forced into an olive 7 cut previously by the knife 11. The serial infeed and transfer stations 1 and 20 are driven from the actuator means 30 by way of a single wheel 45 with a toothed profile 46 which is rotated intermittently in one direction only. The toothed wheel 45 is connected mechanically to the rotating disk 4 by a second chain drive 47 and a pair of bevel gears 81a–81b, and coupled directly to the indexing conveyor wheel 5a of the transfer station 20.

Following each pause of the transfer station 20, rotation of the toothed wheel 45 is brought about by an interference element 48 associated with a rocker arm 49 mounted freely to a fixed pivot 50; a second crank linkage 51 connects the rocker arm 49 to the motor 31.

The toothed wheel 45 is steadied during each pause a friction clutch device 52 positioned in direct contact with the wheel itself.

The screw 15 of the meat paste feeder station 19 is connected mechanically to the actuator means 30 by way of a gear 57 in mesh with a rack 58 invested with guided reciprocating movement in relation to the frame 26 of the machine 17 by the arm 60 of a third crank linkage 61, likewise driven by the one motor 31.

The arm 60 is embodied preferably in two parts 60a and 60b, axially slidable both mutually and against flexible reaction elements 66 located between the two, and associated in operation with an adjustable interference element 65 by means of which to select the stroke of the reciprocating rack 58 and thus regulate the quantity of paste transferred from the feeder station 19 to the injector device 14.

The interference element 65 is mounted to the frame 26 of the machine 17 and affords a stop 91 of which the position can be adjusted to alter the stroke of the rack 58, even during operation of the machine, by turning a knob 92. Accordingly, with a flexible association between the two parts 60a and 60b of the crank arm 60, the length of the arm can adjust automatically to the position of the stop 91. Thus, one has an advantage means of regulating the quantity of meat past directed from the feeder station 19 toward the injector device 14.

69 denotes a cam (FIG. 3c), also forming a part of the actuator means 30, positioned to impinge on the die 41 of the shaping device 40 and thus operate in conjunction with the flexible reaction elements 41a to invest the die 41 with movement toward and away from the single olives 7 contained in the pockets 6 of the wheel 5a during successive pauses of the transfer station 20.

Finally, the mechanically interdependent actuator means 30 comprise a push rod 55 positioned in such a way as to engage the single olives 7 occupying the holes 21 of the rotating disk 4 and, in the event that the dimensions of the olive should be greater than the width of the hole 21, to eject the olive forcibly down toward the transfer station 20. The push rod 55 is connected mechanically to the toothed wheel 45 via an interconnecting linkage 56 embodied in such a manner that the rod 55 is caused to alternate between an inactive raised position, during which the wheel 45 is indexed, and a lowered active position occupied during the pause between indexed steps.

To illustrate the operation of the machine 17, the basic cycle of steps performed on one olive 7 may be summarized thus:

- a supply of stoned olives 7 is placed in the infeed station 1;

- the single olive 7 drops into one of the holes 21 of the rotating disk 4 and is indexed through the passage 35 until in vertical alignment with the slot 23 of the fixed disk 22;

- the olive 7 is released and/or urged downwards by the push rod 55, falling thus into a corresponding pocket 6 of the conveyor 5 beneath;

- the conveyor 5 indexes, whereupon the olive 7 is cut and spread open as it approaches the injector device 14;

- the conveyor 5 pauses, positioning the opened olive in alignment with the injector device 14, and a portion of meat paste received from the feeder station 19 is directed into the void 7b;

- the stuffed olive 7a is indexed by the conveyor 5 until in alignment with the shaping device 40, and invested thereupon by the die 41;

- the die 41 retracts to its inactive position, allowing the conveyor to index further;

- the stuffed and shaped olive 7a is removed from the pocket 6 of the conveyor 5 by the ejection device 18.

What is claimed:

1. A machine for stuffing stoned olives automatically with meat paste, comprising:
   - a serial infeed station;
   - a runout station from which the stuffed olives emerge;
   - a transfer station by which stoned olives are carried singly from the infeed station to the runout station, comprising an intermittently driven conveyor affording at least a plurality of mutually aligned pockets in which the olives dispensed from the serial infeed station are taken up during the pauses of the conveyor, and a longitudinal profiled channel coinciding with the pockets and extending the entire length of the conveyor;
   - a cutting station, lying between the serial infeed station and the runout station and equipped with a knife that occupies a position elevated in relation to the bottom part of the olives carried in the single pockets of the conveyor in such a way as to cut longitudinally through the uppermost part of the olive only;
   - a divaricator, occupying a fixed position in the profiled channel immediately beyond the knife in the direction of the runout station, and serving to spread apart the sides of each previously cut olive in such a way as to create a discernible void;
   - an injector device, supplied with meat paste from a feeder station and activated during each pause of the conveyor to force a quantity of meat paste from the outlet section of a relative nozzle into the void opened by the divaricator;
   - actuator means by which the various movements of the serial infeed station, the transfer station, the injector device and the meat paste feeder station are brought about and synchronized one with another.

2. A machine as in claim 1, further comprising a device located preceding the runout station, by means of which olives stuffed with the meat paste are ejected from the corresponding pockets of the conveyor and caused to drop in the direction of the runout station.

3. A machine as in claim 1, wherein stoned olives are dispensed from a serial infeed station comprising:
   - a container positioned above the transfer station;
   - an intermittently rotatable disk disposed directly beneath and adjacent to the base of the container and activated synchronously with the conveyor of the transfer station, which affords a plurality of holes each able to accommodate a single olive;
   - a fixed disk disposed directly beneath the rotating disk in such a way as to support the olives occupying the relative holes, and affording at least one slot with which an olive is brought into vertical alignment at each pause of the conveyor and allowed thus to fall freely into a corresponding pocket of the conveyor beneath.

4. A machine as in claim 1, wherein the conveyor consists in an intermittently rotating wheel of which the pockets are shaped to match the olives and spaced uniformly apart in continuous succession around the peripheral rotating surface, and of which the longitudinal channel exhibits a profile, seen in transverse section through the wheel, consisting in a first substantially radial gap nearer to the peripheral surface, and a second gap merged with and of greater transverse dimensions than the first, respectively and successively accommodating the knife by which the stoned olives are cut longitudinally and the divaricator by which the cut olive is spread open and offered frontally to the injector device for stuffing with meat paste, the knife anchored to the frame of the machine and the divaricator rigidly associated with the knife at the end nearest the runout station.

5. A machine as in claim 1, wherein the meat paste feeder station comprises a hopper serving to hold a supply of paste, a tubular feeder associated with the bottom of the hopper and connecting with the injector device in such a manner as to permit of directing the paste to the nozzle, and a power driven rotary element disposed internally of the hopper by which the paste is directed into the feeder beneath.

6. A machine as in claim 1, wherein actuator means are mechanically interdependent and driven by a single common motor, in such a way that the movements and the relative operations of the serial infeed station, the transfer station, the nozzle of the injector device and the meat past feeder station can be generated and controlled simultaneously.

7. A machine as in claim 1, wherein the knife is fixed and exhibits a substantially wedge shaped profile, comprising a first edge fully inserted in the channel, of which the contour is matched to the longitudinal profile of the channel, and a sharp, raking second edge that is partly inserted in the channel and meets the bottom edge at an acute cutting angle of which the vertex is directed against the rotation of the conveyor.

8. A machine as in claim 1, further comprising a device located preceding the runout station and serving to ensure a regular shape of the stuffed olives, which consists in a die matched to the shape of the single olive and invested with guided reciprocating movement by the actuator means during successive pauses of the transfer station, in such a way as to impinge upon each successive olive stuffed with meat paste and occupying a respective pocket of the conveyor.

9. A machine as in claim 2, wherein the device by which stuffed olives are ejected from the conveyor consists in an element substantially of wedge profile insertable in the longitudinal channel, occupying a fixed position relative to the rotation of the wheel and riding all but in contact with the bottom of the channel, which is disposed with the point of the wedge profile directed against the rotation of the wheel, and with the outermost edge angled tangentially in such a way as to intercept and unseat the stuffed olives from the respective pockets.

10. A machine as in claim 3, comprising a serial infeed station of which the container exhibits a flat vertical side wall positioned over the conveyor and joined at each end to the ends of a curved second side wall appearing as part of an essentially cylindrical surface, wherein the rotating and fixed disks both emerge in part from the container by way of a passage afforded by the flat side wall to afford two respective exposed portions, the slot occupies the exposed portion of the fixed disk, and the stoned olives are conveyed by the rotating disk to the slot by way of the passage.

11. A machine as in claim 10, comprising a plate attached to the side walls internally of the container, positioned parallel with and marginally above the rotating disk at the end of the flat wall from which the disk rotates outward, and serving to prevent the olives from jamming in the passage and becoming crushed during the rotation of the disk.

12. A machine as in claim 6, wherein the mechanically interdependent actuator means comprise a first chain drive set in motion by the single motor and connected mechanically to a first crank linkage serving to reciprocate a rod, mounted slidably and guidedly within the injector device, between a retracted position in which the device is charged with meat paste from the feeder station, and an extended position that coincides with activation of the nozzle during each pause of the conveyor, in which paste is driven forward by the sliding rod and forced into a previously cut olive.

13. A machine as in claim 6, wherein both the serial infeed station and the transfer station are connected mechanically, the former by way of a second chain drive, the latter coupled direct, to a single wheel with a toothed profile that is rotated intermittently in one direction only by the action of an interference element associated with a rocker arm mounted freely to a fixed pivot, driven by the motor through a second crank linkage, and steadied during each pause by a friction clutch device engaging in direct contact with the wheel itself.

14. A machine as in claim 6, wherein the mechanically interdependent actuator means further comprise a screw serving to activate the meat paste feeder station, which is connected rigidly to a gear in mesh with a rack capable of guided reciprocating movement in relation to the frame of the machine, brought about by the arm of a third crank linkage driven from the same single motor.

15. A machine as in claim 8, wherein the die of the shaping device is associated with the actuator means by way of a power driven cam impinging on the die against flexible reaction elements.

16. A machine as in claim 13, wherein the mechanically interdependent actuator means further comprise means by which olives are engaged and directed from the serial infeed station to the transfer station, consisting in a push rod connected mechanically to the toothed wheel through a linkage by which it is invested with alternating movement, synchronously with the indexing movement of the wheel, between an inactive raised position, occupied while the wheel is rotated through one step, and a lowered active position assumed during the pauses of the wheel.

17. A machine as in claim 14, wherein the arm of the third crank linkage is embodied in two parts, axially slidable both mutually and against flexible reaction elements located between the two, and operated in conjunction with an adjustable interference element rigidly associated with the frame of the machine by means of which to select the stroke of the rack and thus regulate the quantity of meat paste transferred from the feeder station to the injector device.

18. A machine as in claim 17, wherein the interference element incorporates a mechanical stop designed to interact with the rack, of which the position is adjustable, even during operation of the machine, by means of a knob.

* * * * *

UNITED STATES PATENT AND TRADEMARK OFFICE
CERTIFICATE OF CORRECTION

PATENT NO. : 5,176,070

DATED : January 5, 1993

INVENTOR(S) : Marco PENNESI

It is certified that error appears in the above-identified patent and that said Letters Patent is hereby corrected as shown below:

On title page, item [19] "Marco" should read --Pennesi--
              item [76] "Pennesi Marco" should read --Marco Pennesi--

Signed and Sealed this

Twenty-fourth Day of May, 1994

Attest:

BRUCE LEHMAN

Attesting Officer    Commissioner of Patents and Trademarks